United States Patent
Bauchot et al.

(10) Patent No.: US 7,693,612 B2
(45) Date of Patent: Apr. 6, 2010

(54) METHOD AND SYSTEM FOR UPDATING CODE EMBEDDED IN A VEHICLE

(75) Inventors: Frederic Bauchot, Saint-Jeannet (FR); Olivier Casile, St Laurent du Var (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 11/447,529

(22) Filed: Jun. 6, 2006

(65) Prior Publication Data

US 2006/0294514 A1 Dec. 28, 2006

(30) Foreign Application Priority Data

Jun. 23, 2005 (EP) ................................. 05300506

(51) Int. Cl.
*G06F 9/46* (2006.01)
(52) U.S. Cl. ............................................. 701/1; 701/33
(58) Field of Classification Search ........................ None
See application file for complete search history.

(56) References Cited

U.S. PATENT DOCUMENTS

| | | | |
|---|---|---|---|
| 6,754,485 B1* | 6/2004 | Obradovich et al. | 455/414.1 |
| 6,885,916 B2* | 4/2005 | Remboski et al. | 701/1 |
| 7,188,026 B2* | 3/2007 | Tzamaloukas | 701/200 |
| 7,366,589 B2* | 4/2008 | Habermas | 701/1 |
| 7,382,274 B1* | 6/2008 | Kermani et al. | 340/901 |
| 7,415,243 B2* | 8/2008 | Yuhara et al. | 455/12.1 |
| 7,506,309 B2* | 3/2009 | Schaefer | 717/120 |
| 2003/0115262 A1 | 6/2003 | Dai | |
| 2003/0188303 A1* | 10/2003 | Barman et al. | 717/170 |
| 2004/0082350 A1* | 4/2004 | Chen et al. | 455/518 |

FOREIGN PATENT DOCUMENTS

| | | |
|---|---|---|
| DE | 10211426 A1 | 10/2003 |
| EP | 1001348 A1 | 5/2000 |
| EP | 1246481 A2 | 10/2002 |
| EP | 1347604 A1 | 9/2003 |
| GB | 2351588 A * | 1/2001 |
| JP | 05012000 A | 1/1993 |
| WO | 0177877 A2 | 10/2001 |
| WO | 0211346 A2 | 2/2002 |

* cited by examiner

*Primary Examiner*—Michael J. Zanelli
(74) *Attorney, Agent, or Firm*—Ronald Kaschak; Hoffman Warnick LLC (57) ABSTRACT

A system, method and computer program for updating computer programs embedded in a vehicle is disclosed. Wireless communication means are used to detect and contact one of a plurality of neighbor vehicles. Information is exchanged with the contacted neighbor vehicle related to a plurality of computer programs embedded in the vehicle and the neighbor vehicle. One of a plurality of computer programs is requested and retrieved from the contacted neighbor vehicle. Another of the plurality of computer programs is delivered to the neighbor vehicle. The retrieved computer program is validated and installed.

20 Claims, 8 Drawing Sheets

Software_list table

| Software_Id | Version | Editor | Prereq | received chunk | Size | Status | Prty |
|---|---|---|---|---|---|---|---|
| GPS01 | 5.01.02 | GPSequip | | 1111111......100 | 1.23M | Installed | 5 |
| GPS01 | 5.01.03 | GPSequip | | 11011111......000 | | Downloading | 5 |
| BIGCAR03 | 10.002 | BigCarCo | | 1111111......100 | 834K | Installable | 1 |
| ...... | | | | | | | |

FIG. 2A

Chunk_list table

| Software_Id | Version | Chunk# | Chunk signature |
|---|---|---|---|
| GPS01 | 5.01.02 | 1 | ed12fshyuzuuuz |
| GPS01 | 5.01.02 | 2 | fdfdfdf112js |
| ...... | | | |
| GPS01 | 5.01.02 | 33 | sdfey44f5Rfg |
| BIGCAR03 | 10.002 | 2 | arzvshh576shsh |
| GPS01 | 5.01.03 | 1 | nbnjdfjuez6gdg5 |
| ...... | | | |
| BIGCAR03 | 10.002 | 13 | 100zasqxgf55fdf6666 |
| GPS01 | 5.01.03 | 27 | fdftz442eggj77i |
| ...... | | | |

FIG. 2B

Editor_List table

| Editor | Public key |
|---|---|
| GPSequip | 129AB425CD5244F44D |
| BigCarCo | 1234567890ABCDEF00 |
| ...... | |
| BrakeCo | 9887EA9A9876AB444 |
| AUTOequip | 434343DAEAD4277889 |
| ...... | |

METHOD AND SYSTEM FOR UPDATING CODE EMBEDDED IN A VEHICLE

CROSS-REFERENCE TO RELATED APPLICATIONS

The current application claims the benefit of co-pending European Patent Application No. 05300506.2, filed Jun. 23, 2005, and is related in some aspects to commonly owned U.S. application Ser. No. 11/447,528, filed Jun. 6, 2006 and entitled "Method and System for Transmitting a Message Between Two Isolated Locations Based on Limited Range Communication Means."

FIELD OF THE INVENTION

The present invention is directed to automotive computers and more particularly to a system, method and computer program for broadcasting embedded code updates.

BACKGROUND OF THE INVENTION

In the past years, car manufacturers have introduced more and more Information Technology into cars. More and more functions, traditionally implemented in hardware, can now be implemented with more flexibility using software programs. The engine, the brakes, the traction, the positioning system, and even the driver himself can be controlled by embedded software. A typical mid-range car has nowadays 70 or more of its functions driven by Electronic Control Units, all of them together running millions of lines of code. Bugs are one of the inherent characteristics of software. Manufacturers are under pressure to reduce the development cycle of cars. This inevitably results in insufficient testing of embedded software, and delivery of software which may still have some problems. The update and modification of embedded software is therefore more and more frequent and critical. Since software is now handling vital components, there is clearly a security exposure. This is also an exposure in term of after sales cost, because recalling large numbers of cars in order to update software under warranty is very expensive and degrades the credibility of the car manufacturer in the public's mind. Furthermore it is quite detrimental to the image of a manufacturer when cars are recalled and the recall is publicized in the public media.

In addition, car manufacturers are considering adding new optional software to cars for new added value functions. Soon it will be possible for drivers to have access to a portal managed by the car manufacturer and from this portal, to select (purchase) software options (for instance navigation functions, closest points of interest, closest hotels and restaurants, voice recognition, active cruise control, etc.), and transfer these selected software options to their car. It can also be envisioned that the success of the widely spread peer-to-peer networks, from where people download music, videos and software, will cause the emergence of peer-to-peer data networks between cars.

The consequence of the quick emergence of embedded software in cars is increasing the need for a mechanism for car manufacturers and third parties, to be able to transfer software and data to cars at any location, for example, parked, on the road, in urban areas, or in the countryside.

Today, car manufacturers still recall cars for critical software updates, and are performing "silent" updates during regular car repair and maintenance operations for minor software changes. An obvious problem with this approach is the cost:

for the car manufacturers, because the dealers must be reimbursed for the time spent to update the cars;
for the car dealers, who lose time on these low profit margin operations, and may have to provide replacement cars;
for the consumers, who lose time and use of the car.

The problem of car recall costs clearly implies a need for a software mechanism that can directly update software in cars, "in place", without recalls.

Moreover, the process of recalling cars may become much more difficult in the near future. Car dealers will have the ability to sell cars from different car manufacturers. Car dealers flooded by software updates from many car manufacturers will not be able to orderly manage the updates. Direct communication between car manufacturers and cars is complicated when car dealers must distribute and update software. Car manufacturers are considering setting up Telematics services in order to communicate directly with cars. The problem encountered is a lack of appropriate networking infrastructure to reach cars in many various diverse locations:

GSM and GPRS have a good coverage, but are expensive and have a low throughput, UMTS is not perfected and will be expensive, Wifi has a good throughput, but a relatively short range and is expensive to deploy everywhere.

The ideal solution would be a pervasive network, with a light infrastructure being inexpensive for both car manufacturers and car owners.

OBJECTS AND SUMMARY OF THE INVENTION

An object of the present invention is to download to a vehicle a more recent version of one or more embedded codes from another vehicle.

It is another object of the present invention to associate with each embedded code a code level, a Vehicle Identification Number (VIN), and a list of prerequisite hardware and software.

It is a further object of the present invention to download code by segments, in any order.

It is a further object of the present invention to concurrently download segments of a same code to different vehicles in a neighborhood in order to maximize the probability and reduce the time of obtaining complete codes.

It is a further object of the present invention to sign each segment of code with a one way hashing of the data (MD5 or SHA-1 or any similar hashing algorithm) and to encrypt the resulting hashing with the code editor private key.

According to one aspect of the invention a method for updating embedded computer programs in a vehicle is provided, the method comprises the steps of detecting and contacting one of a plurality of neighbor vehicles using wireless communication means, exchanging information with the contacted neighbor vehicle related to a plurality of computer programs embedded in the vehicle and the neighbor vehicle, requesting and retrieving from the contacted neighbor vehicle one of the plurality of computer programs based on the information previously exchanged, delivering another of the plurality of computer programs to the contacted neighbor vehicle based on the information previously exchanged, checking the validity of the delivered computer program, and installing the delivered computer program.

According to another aspect of the invention there is provided a system for updating computer programs in a vehicle comprising, means for detecting and contacting one of a plurality of neighbor vehicles using wireless communication means, means for exchanging information with the contacted neighbor vehicle related to a plurality of computer programs embedded in the vehicle and the neighbor vehicle, means for requesting and retrieving from the contacted neighbor vehicle one of the plurality of computer programs based on the information previously exchanged, means for delivering another of the plurality of computer programs to the contacted neighbor vehicle based on the information previously exchanged, means for checking the validity of the delivered computer program, and means for installing the delivered computer program.

According to yet another aspect of the invention there is provided a computer program executed on a computer system for updating embedded computer programs in a vehicle comprising the steps of detecting and contacting one of a plurality of neighbor vehicles using wireless communication means, exchanging information with the contacted neighbor vehicle related to a plurality of computer programs embedded in the vehicle and the neighbor vehicle, requesting and retrieving from the contacted neighbor vehicle one of the plurality of computer programs based on the information previously exchanged, delivering another of the plurality of computer programs to the contacted neighbor vehicle based on the information previously exchanged, checking the validity of the delivered computer program, and installing the delivered computer program.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the broadest scope consistent with the principles and features described herein.

PRINCIPLE OF THE INVENTION

Today vehicles have several embedded computers or processors, each of them executing several programs, stored as embedded software (computer program or code) in some memory in the vehicles. The objective of the present invention is to allow a first vehicle, carrying a recent version of a code, to provide other vehicles having older versions of this code with the more recent version. It is assumed that the two vehicles exchange information using point to point low range wireless communication means like Bluetooth, Infrared or any other similar wireless technology. The two vehicles can be moving, parked or blocked in traffic.

The present invention relates to the update of several embedded codes. Each code includes:

- a unique identification. The code identification comprises the car brand, and type (part of the Vehicle Identification Number, or VIN in short) and of the code level (embedded software performing a given function can come with several subsequent updates, or levels).
- A list of hardware and software that are prerequisite to install the embedded code. The prerequisite list details the list of the required hardware and software, with its levels, that need to be installed in a car before a code update can be performed.

Each code is logically subdivided in a number of segments (chunks of bytes), of a reasonable and fixed size. The segmenting facilitates the transfer of large amounts of code when the communication between two vehicles cannot be maintained for a long enough period of time to transfer an entire code, of large size (several megabytes). This typically happens when the communication occurs between moving vehicles.

When two vehicles A and B establish a communication, the first message they exchange is "IOWN(Vx,Nx))", sent from A to B and from B to A. This message comprises:

- a list of all the embedded codes owned by each vehicle;
- an identification, version, size and installation prerequisite list of each code;
- a list of the segments they have already received for each code.

After the exchange of the IOWN messages, each vehicle is able to determine whether or not the other vehicle is carrying a more recent version of any of the codes it is carrying, and which segment(s) of code it can obtain from the other vehicle. When a vehicle determines that it can obtain one or more code segments from another vehicle, it starts a code transfer session for the selected segments of code to be obtained. The communication is peer to peer and each vehicle can act both as a server and a client for the other vehicle.

In order to prevent malicious persons from sending inappropriate or non official code to vehicles in the neighborhood, code segments are signed by the code editor. Editors are not necessarily car manufacturers. Editors can also be suppliers of car equipment, or third party providers of added value functions. The signature of a segment of code is typically a one way hashing like MD5, SHA-1 or similar code, encrypted with the private key of the editor. Segment signatures allow the car Electronic Control Units to verify both the integrity and the authenticity of each code segment received.

Figure 1:
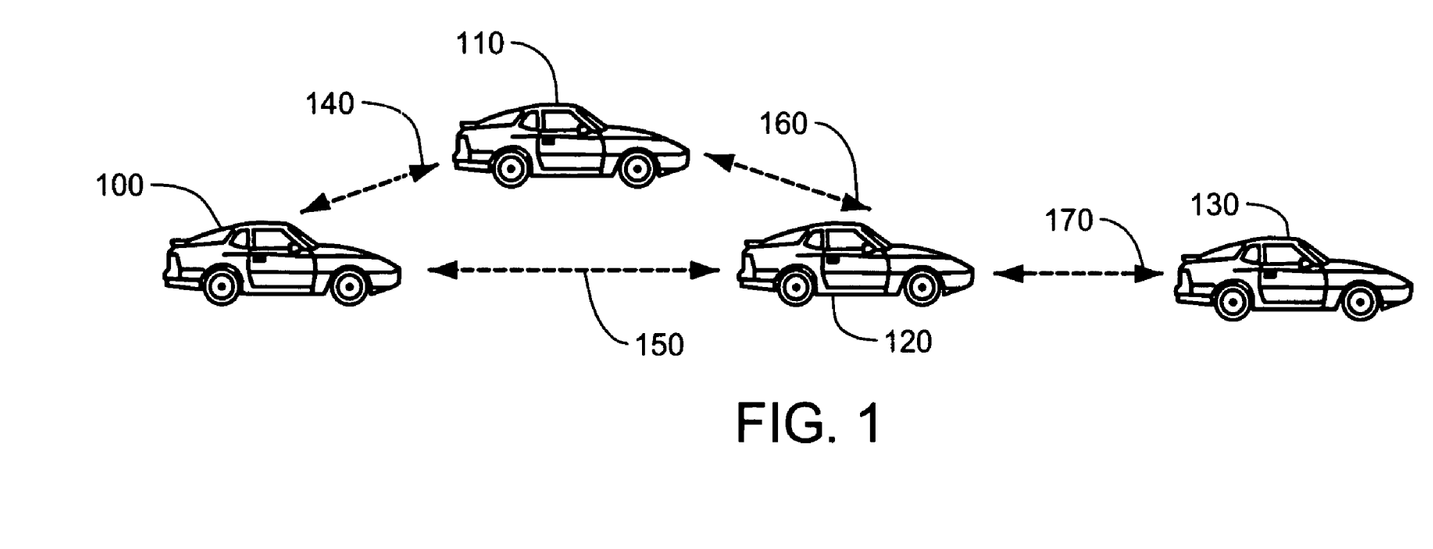
FIG. 1 illustrates vehicles exchanging a last level of embedded code according to the present invention.
Figure 1A:
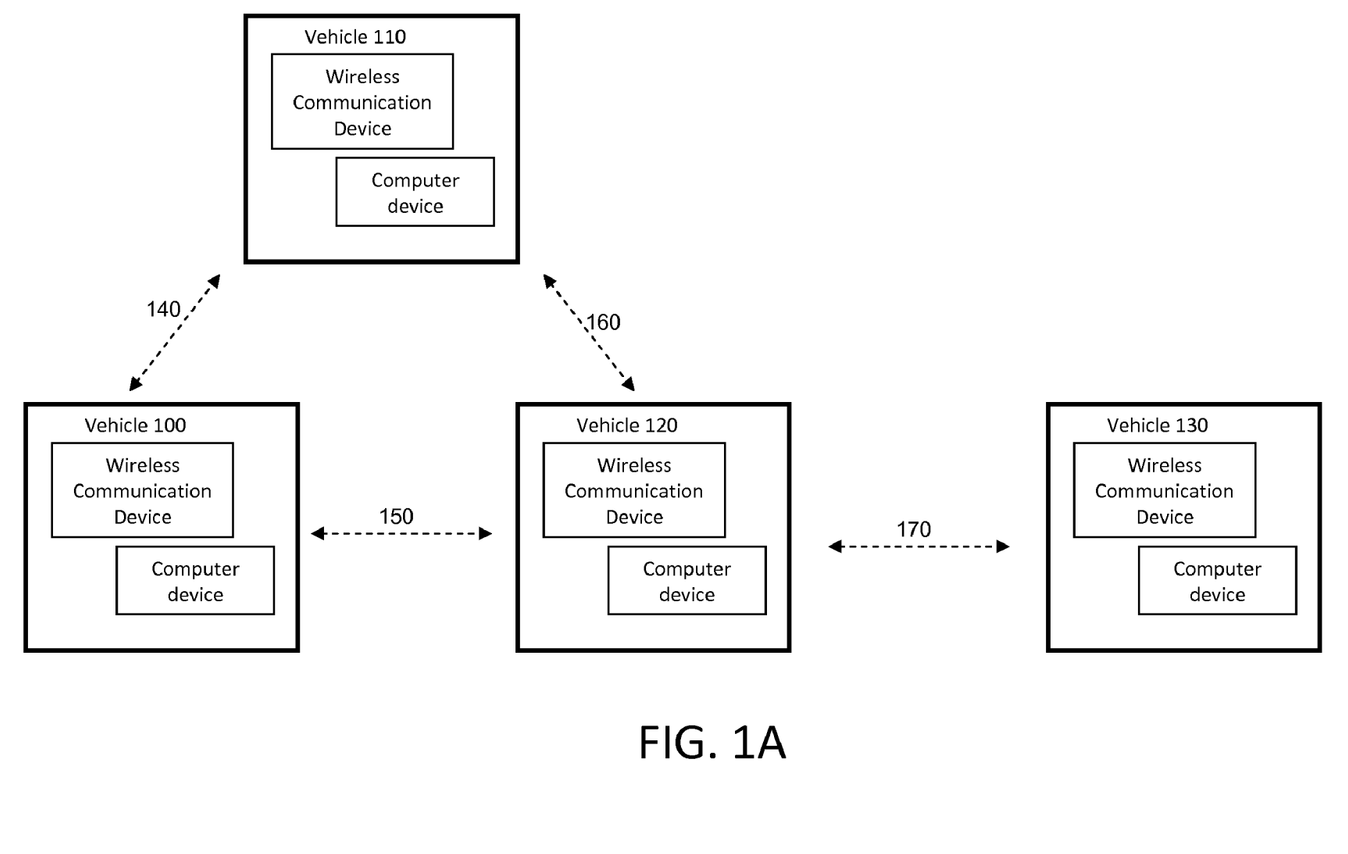
FIG. 1A is a block drawing illustrating FIG. 1 according to the present invention.

Code segments include a sequence number and can be downloaded in any order. The download of a given code can therefore be interrupted at any segment, and restarted either with the same vehicle or with another vehicle. Moreover the download of a given code may be performed simultaneously from several vehicles by requesting different segment numbers of a same code to each partner vehicle. This mechanism, well known in the peer to peer protocols on the Web, maximizes the probability and minimizes the time for obtaining the entire code. This is illustrated by the FIG. 1, a vehicle 120 may simultaneously receive a given code from three vehicles 100, 110 and 130. As shown in FIG. 1A, three vehicles 100, 110 and 130 can each include a wireless communication device and at least one computer device configured to exchange information with the other vehicles, retrieve an updated embedded computer program, contact the other vehicles, provide the embedded computer program for use in the other vehicles, check the validity of the retrieved updated embedded computer program, and install the retrieved updated embedded computer program.

Segments of code are kept in memory (buffered) until the entire code is constituted. When the code is entirely constituted, it can actually be installed on the Electronic Control Unit requiring it. Different levels of a same—incomplete—code can therefore be present in the memory buffer of a car, until a level is complete and installed. In such a circumstance, all "older" levels of the code are discarded from the buffer once a more recent level is complete and installed.

The system and method, that will be described in the following sections, is named "Automotive Network Transfer" (ANT) protocol.

Tables Used to Broadcast the Embedded Code to Other Vehicles

Figure 2A:
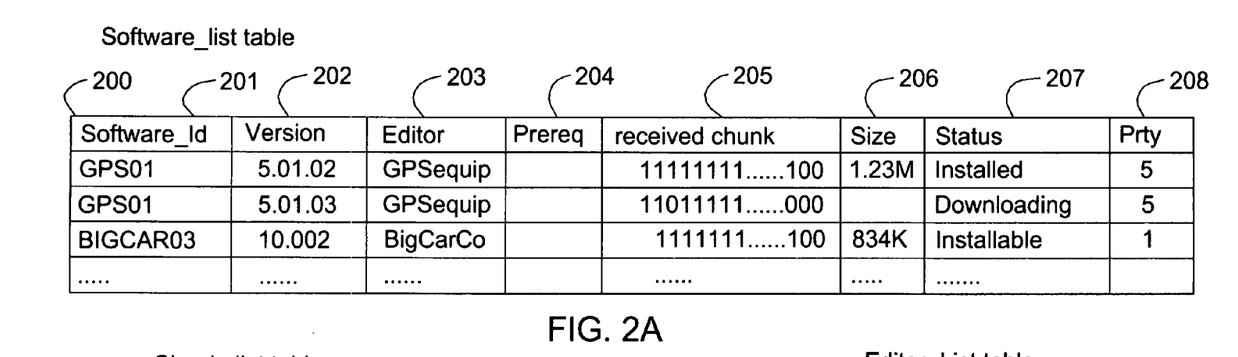
FIG. 2A is a Software_list table according to the present invention.

To broadcast embedded code to other vehicles, a vehicle needs to store a great deal of information:

Software_list Table:
A "Software_list" table 200 (FIG. 2 A) maps all the software's which are identified by:
a "Software_id" 201, and
a "Version number" 202.
Moreover the software editor is recorded in the field "Editor" 203 to be able to retrieve when necessary the own editor's public key.

A "Prerequisite" field 204 is not fully described here, but must contain at least the Vehicle Identifier Number (VIN) to identify whether or not the code is applicable to the receiving vehicle. Although the VIN is partially structured, there are some differences between car manufacturers. Some fields of the VIN as the serial number in the year of the vehicle are replaced by wild characters to indicate that no test has to be done on this field. Prerequisite may also contain some requirements about installed features which may not be identified by the VIN in some cases, for example GPS. Other information relative to prerequisite software or software level may be set in the Prerequisite field.

The "received chunk" field 205 indicates the chunks which have been received. Its length is determined with the chunk length and the maximum size of the code to download. This value must be fixed and should be the same for all vehicles. Bit 0 of byte 0 represents the chunk 1 (first chunk) while the bit x of byte n represents the chunk(8*n+x)). Bit set to 1 indicates that the chunk has been received. If received chunk field is 128 bits in length and chunk data size is 0.5 Mbytes then the biggest code that is downloadable is 64 Mbytes.

The "Size" field 206 indicates the total size of the code.
The "Status" field 207 may take 3 different values which are "Installed", "Installable", when the code has been entirely received but not yet installed, or "Downloading", all the chunks have not yet been received.

Finally, a Priority field 208, indicates the priority of the download. Fields "Software_ID", "Version", "Editor", "Prereq", "Size" and "Prty" are set by the code editor and remain unchanged during all the code broadcasting.

Figure 2B:
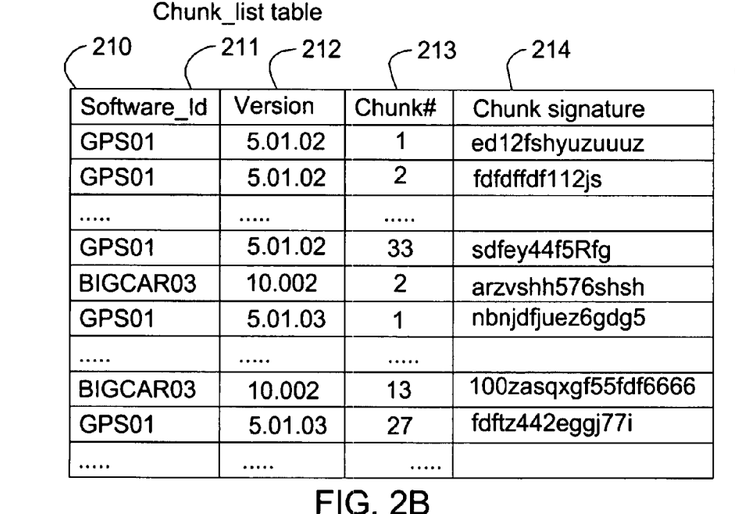
FIG. 2B is a Chunk_list table according to the present invention.

Chunk_list Table:
The "Chunk_list" table 210 shown in FIG. 2B maps all the chunks belonging to all the software which are identified by a "Software_id" 211 and a "Version number" 212. Chunk# 213 gives the chunk number starting from 0. Field "Chunk signature" 214 gives the signature of the chunk which is a one way hashing like MD5 or SHA-1 encrypted with the private key of the code editor.

Figure 2C:
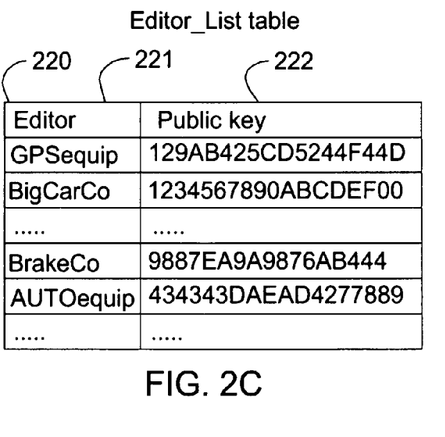
FIG. 2C is a Editor_List table according to the present invention.

Editor_list Table:
The "Editor_List" table shown in FIG. 2C maps all the pieces of editor code with the corresponding public key.

Figure 3:
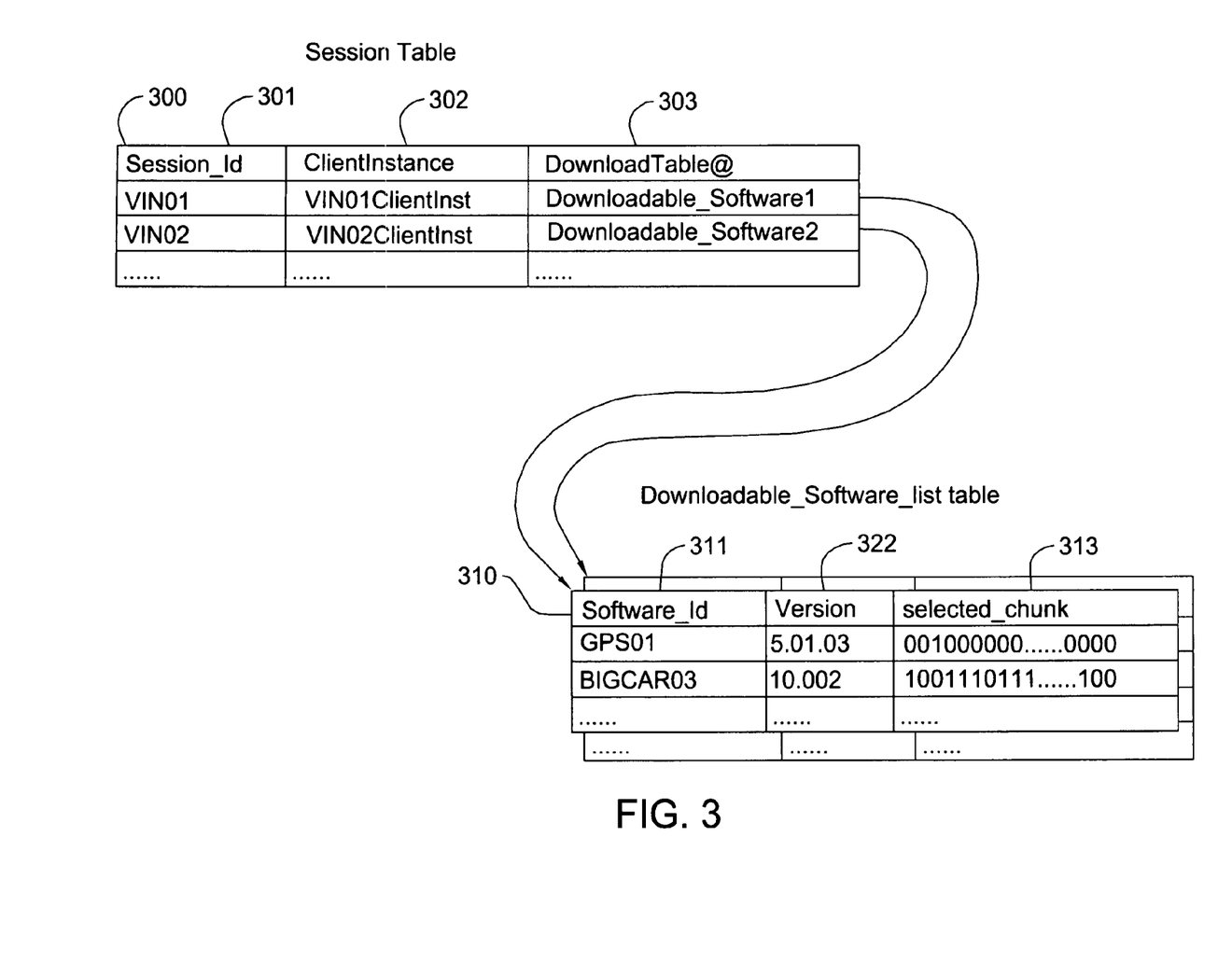
FIG. 3 is the Session Table and the Downloadable_Software_list table according to the present invention.

Session Table and Downloadable_Software_list Table:
The tables in FIG. 3 are used to map the session and the downloadable software.
The "Session" Table 300 is used to keep track of all the sessions established with other entities.
Sessions are identified using the VIN which is placed in the Session_Id field 301.
The "ClientInstance" field 302 addresses the task allocated to the session.
The "DownloadTable@" field 303 points to "Downloadable_Software_list" table 310 associated with the client process which lists all the new codes which have been found on the server and for which the prerequisites are satisfied. These codes are identified both by the "Software_Id" 311 and the "Version" 322. The field "selected_chunk" 313 indicates all chunks which are on the server, but not yet on the client. This can be formally translated as: "selected_chunk"=server_"received_chunk" AND (NOT client_"received_chunk").

Session Manager

Figure 4:
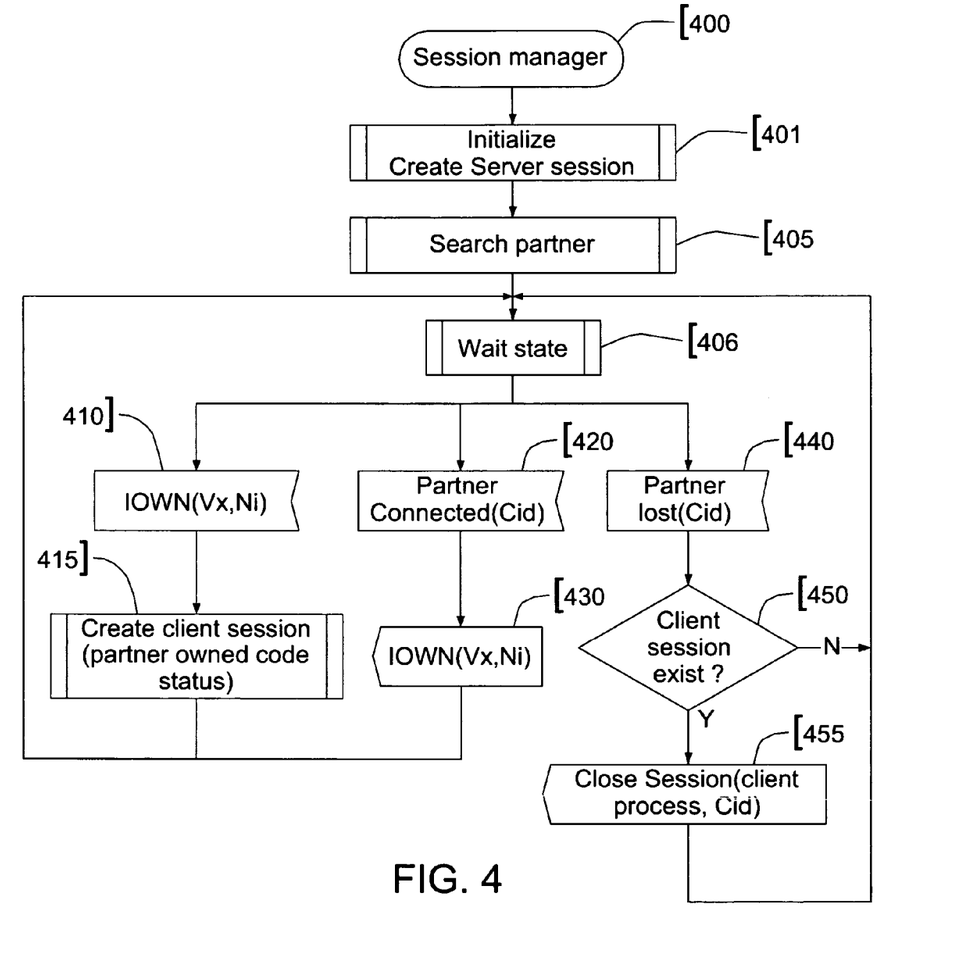
FIG. 4 illustrates a flow chart detailing the role of the Session manager according to the present invention.

FIG. 4 illustrates a flow chart detailing the role of the Session manager 400. Each vehicle has wireless short range means to communicate with other neighbor vehicles. These communications may be set up either when the vehicle is moving or is parked.

At step 401 the communication infrastructure is initialized, a server process is created to hold a request to download a program issued from the remote client and an empty session table 300 is created to record client session information.

In step 405 the vehicle is searching for an other partner:
to broadcast if necessary part of the software it owns or
to download a new software version from a remote partner.

As soon as a new partner has been detected, the physical connection handler sends a message "Partner Connected" 420 to the Session manager which sends the message IOWN 430 to the remote Session manager to give:
the list of softwares which are locally owned with their versions, as well as
the list of chunks available for each software.

IOWM message comprises the "Software_list" table as a parameter. Finally the process goes into wait state 406.

When the event IOWN 410 is received from any remote session manager, a client session process 415 is launched and the session manager goes into wait state 406.

The last event handled is "Partner lost" 440 generated by the physical connection manager when the physical connection has been dropped. On receipt of this event, the session manager verifies if a Client session process exists 450 for this Connection id. If it is the case, then a "Close Session" 455 is sent to the client process in order to stop it and the resources allocated to handle this connection are freed.

Server Process

Figure 5:
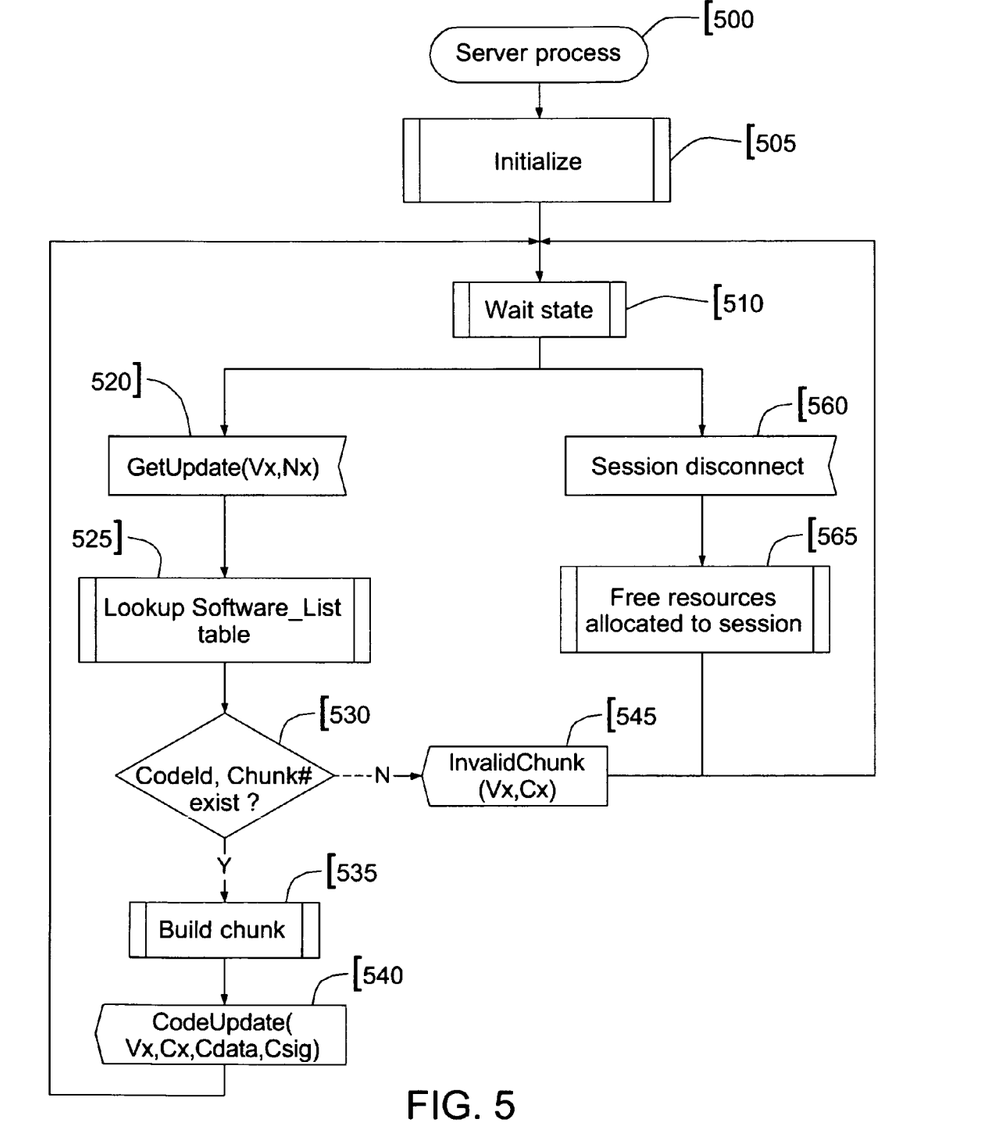
FIG. 5 illustrates a flow chart representing the Server process according to the present invention.

FIG. 5 illustrates a flow chart representing the Server process.

When Server process 500 is launched, it first initializes its environment 505 and goes in wait state 510 to wait for a request from a remote partner to download a new code version.

At step 520 a "GetUpdate" is received having as parameters:
the code identification (Software_Id 201 and Version 202), and
the Chunk number.

Then a Lookup step 525 is performed on the Software_List table 200 to verify:
if the requested software with the requested version exists, and
if the requested chunk is available.

When requested code and Chunk number are found in step 530, then the chunk is built 535 and the message "CodeUpdate" 540 is returned to the requester partner. The message "CodeUpdate" includes 4 parameters which are:
Vx: extracted from a request which identifies the software and the version (Software_Id, Version)
Cx: which identifies the Chunk number
Cdata: the chunk data part
Csig: the Chunk signature 214 which is extracted from the "Chunk_list" table 210 using Vx and Cx (Software_Id, Version, Chunk#) as primary key.

Then the server process goes into state wait state 510.

If requested code and Chunk number have not been found in step 530, then an "InvalidChunk" 545 message is returned with parameters Vx and Cx, and the Server process goes into wait state 510.

When "Session disconnect" 560 is received from a remote client session, this means that the remote client has finished the downloading of selected code. In step 565 the server process frees all resources allocated to the session and goes into wait state 510 to process the next event.

Client Process

Figure 6:
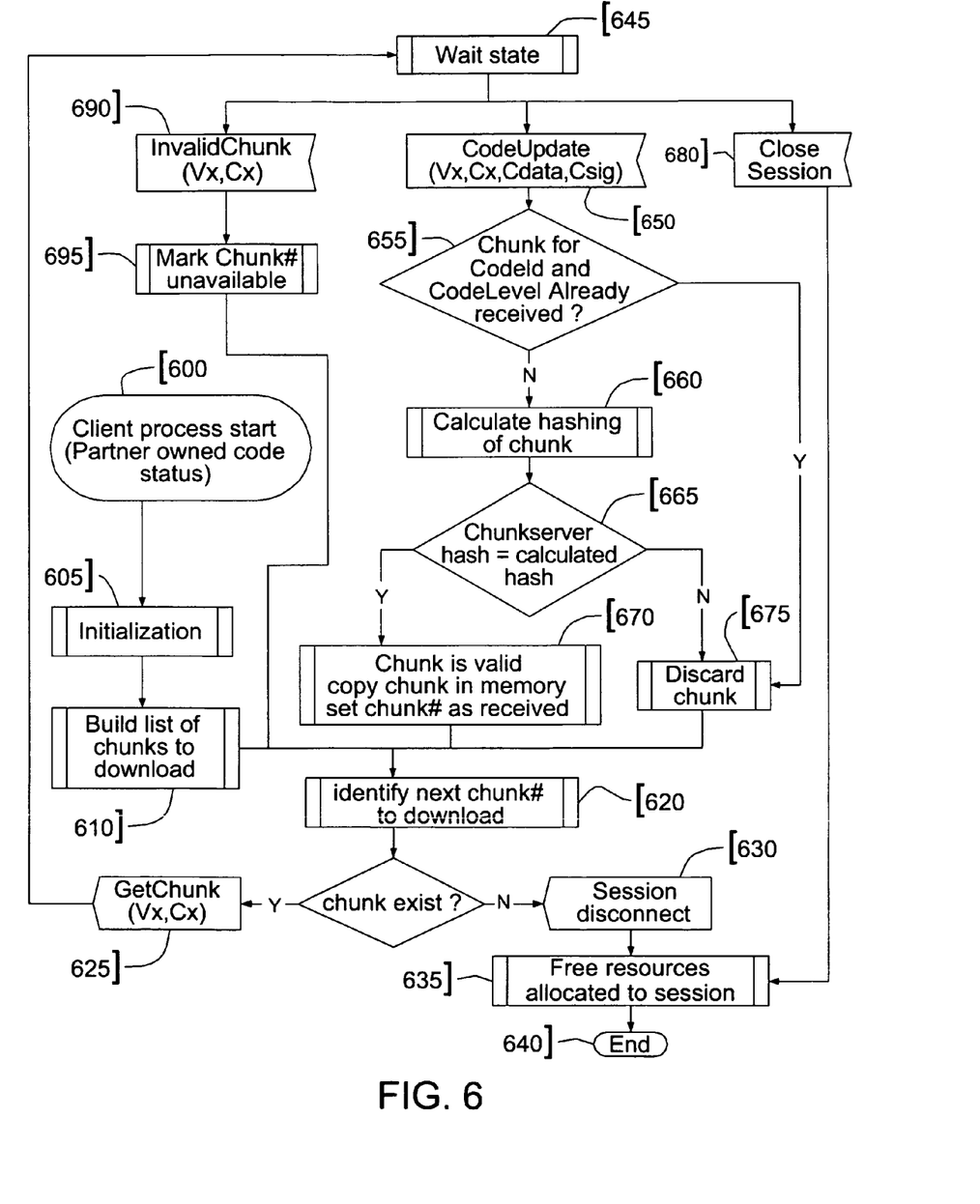
FIG. 6 illustrates a flow chart representing the Client process according to the present invention.

FIG. 6 illustrates a flow chart representing the Client process.

When the Client process 600 is launched with the partner owned code status as parameter, it first initializes 605 a new entry in the "Session" table 300 and creates a new empty "Downloadable_Software_list" table 310.

Figure 7:
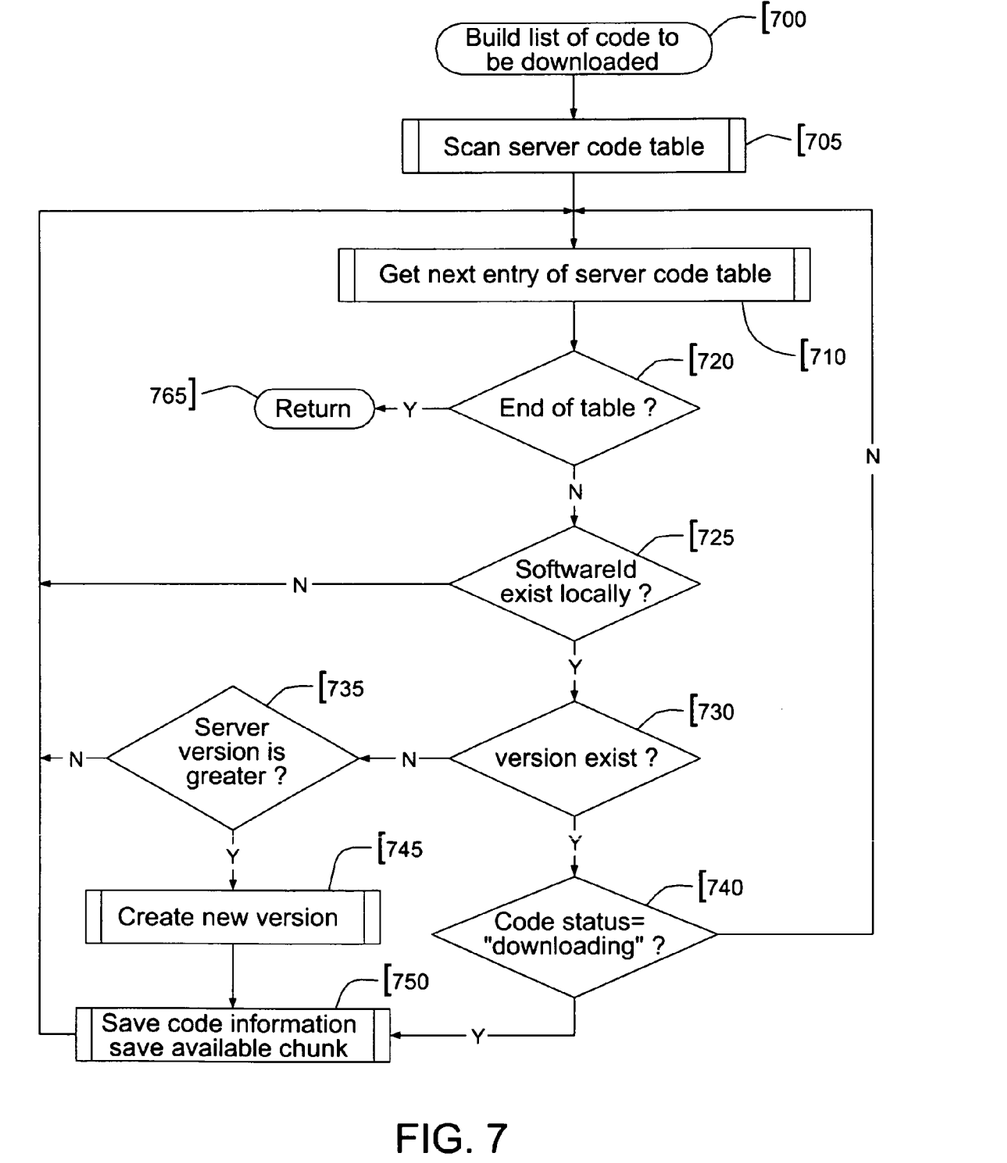
FIG. 7 illustrates a method of building a list of code and chunk to download according to the present invention.

Step 610 builds the list of chunks to be downloaded. Building of the Chuck list is depicted in FIG. 7 and is described herein below.

After building Downloadable_Software_list table 310, the first Chunk number to be downloaded is identified in step 620. In step 620 the "Downloadable_Software_list" table is scanned starting with the highest priority software and getting the first Chunk number available to be downloaded.

If a chunk is available (ready to be downloaded), the request 625 "GetChunk" is sent to the remote partner server with parameters:
Vx (Software_Id, Version) and
Cx (Chunk number).

Then the process goes in a wait state 645 for the next event.

if no chunk is available (ready to be downloaded), a message "Session disconnect" 630 is sent to the remote partner server and the resources allocated to the session are released in step 635. The Downloadable_Software_list table belonging to the session is destroyed and the entry corresponding to the client instance in the session table 300 is removed.

Finally the process ends in step 640.

At Step 690, the received message indicates that the requested Chunk number is not available, so the Chunk number is marked unavailable 695 in "Downloadable_Sotaware_list" table 310 by turning off the bit corresponding to the Chunk number Cx. Then the process continues at step 620 (described above).

At step 650, the received message indicates the reception of the requested chunk. Checking is done at step 655 against "Software_list" table 200 to verify that the Chunk number has not already been received.

If the chunk has already been received, then it is discarded at step 675. The process continues with step 620.

If the chunk has not already been received, a one way hashing MD5 or SHA-1 is calculated at step 660 on chunk data (Cdata).

One way hashing is compared at step 665 to the hashing extracted from the signature (Csig) sent by the partner server. Signature (Csig) is decrypted using "Public key" 222 of "Editor_List" table 220 indexed by the received code identification Vx.

If both hashings do not match, then the chunk is discarded at step 675. Then the process continues with step 620.

If both hashings match, the chunk is valid. At step 670:
data part of the chunk (Cdata) is saved,
the chunk number is turned on in field "received chunk" 205 of the "Software_list" table,
the chunk number is turned off in field "selected_chunk" 313 of "Downloadable_Software_list" table to indicate that the chunk is not eligible to download and
a new entry in "Chunk_list table" 210 is created filling all fields with the received parameters value.

The process continues with step 620.

At step 680 the "Close session" message indicates that the physical connection with the partner has been lost:
the resources allocated to the session are released at step 635.
the "Downloadable_Software_list" table belonging to the session is destroyed.
the entry corresponding to the client instance in Session Table 300 is removed.

At step 640 the process ends.

The procedure used to build the list of chunks (Dowloadable_Sotware_list table) to download is described herein below. This method is illustrated in FIG. 7.

The list of codes owned by the server and received in IOWN message 410 is recorded in a temporary table named server code table The process is launched at step 700.

At step 705 a scanning of the server code table is initialized.

At step 710 the next server code entry is selected.

When the last entry is reached at step 720, the building of the server code table is complete and at step 765 the process ends.

Otherwise, a checking step 725 is performed in the local "Software_list" table 200 in order to determine whether this software is installed and its prerequisites are met.

If the software is not installed or prerequisites are not met, the next entry of the server code table is examined at step 710, otherwise at step 730 checking whether the software version exists locally is performed.

If the software from the server already exists locally at the same version level, then:

At the step 740 if the local code status is "downloading", which means that all chunks have not yet been received, and a new entry is created at step 750 in "Downloadable_Software_list" table 310, initializing "Software_Id", "Version" and "Selected_chunk" 313 which indicates all chunks which are on the server, but not yet on the client. This can be formally translated as: "selected_chunk"=server_"received_chunk" AND (NOT client_"received_chunk"). Then the process continues and the next entry of the server code table is examined at step 710.

If the local status is not "downloading" which means that the code is already installed or installable, then the process continues and the next entry of the server code table is examined at step 710.

If the software server version does not exist locally, at step 735 checking is performed to verify that the received version is greater than the highest local version of this software.

If the received version is greater than the highest local version of this software, at step 745 a new entry is created in "Software_List" table 200 initializing:

"Software_Id",
"Version",
"Editor",
"Prereq",
"Size", and
"Prty",
with the received values.

All bits of "Received_chunk" are set to off, that means that no chunk was received.

The "Status" is set to "Downloading".

Then at step 750 a new entry is created in the "Downloadable_Software_list" 310, initializing "Software_Id", "Version" and "selected_chunk" 313 which indicates all chunks which are on the server, but not yet on the client. This can be formally translated as: "selected_chunk"=server_"received_chunk".

The process continues and the next entry of the server code table is examined at step 710.

If the received version is not greater (older) than the highest local version of this software, the process continues and the next entry of the server code table is examined at step 710.

While the invention has been particularly shown and described with reference to a preferred embodiment, it will be understood that various changes in form and detail may be made therein without departing from the spirit, and scope of the invention.

What is claimed is:

1. A method for updating an embedded computer program on a first vehicle, the method comprising:
    exchanging information between the first vehicle and a second vehicle related to the embedded computer program, wherein the embedded computer program is logically divided into segments and the exchanged information includes: an identification, version, size and installation prerequisite list for the embedded computer program, and a list of the embedded computer program segments each vehicle has already received for the embedded computer program; and
    retrieving at least one segment of an updated embedded computer program at the first vehicle from the second vehicle based on the exchanged information.

2. The method according to claim 1, further comprising contacting the second vehicle from the first vehicle using wireless communication means.

3. The method according to claim 1, further comprising:
    exchanging information with the second vehicle related to a second embedded computer program; and
    providing at least some of the second embedded computer program for use in the second vehicle based on the exchanged information.

4. The method according to claim 1, wherein the retrieved updated embedded computer program is more recent than the embedded computer program in the first vehicle.

5. The method according to claim 1, further comprising checking a validity of the retrieved updated embedded computer program, wherein the checking the validity of the retrieved updated embedded computer program includes checking an integrity and an authenticity of the retrieved updated embedded computer program using a signature associated with the retrieved updated embedded computer program.

6. The method according to claim 1, wherein the retrieving includes retrieving the updated embedded computer program from a plurality of vehicles.

7. The method according to claim 1, further comprising installing the retrieved updated embedded computer program.

8. The method according to claim 1, wherein the retrieving includes checking installation prerequisites of the updated embedded computer program.

9. The method according to claim 1, wherein the exchanging includes exchanging information related to a first version of the embedded computer program on the first vehicle and a second version of the embedded computer program on the second vehicle.

10. The method according to claim 9, wherein the retrieving includes retrieving the second version of the embedded computer program at the first vehicle, wherein the second version of the embedded computer program is more recent than the first version of the embedded computer program.

11. A system for updating an embedded computer program on a first vehicle comprising:
    a first vehicle including:
        at least one computing device including:
            wireless communication device for exchanging information with a second vehicle related to the embedded computer program, wherein the embedded computer program is logically divided into segments and the exchanged information includes: an identification, version, size and installation prerequisite list for the embedded computer program, and a list of the embedded computer program segments each vehicle has already received for the embedded computer program; and a component configured to retrieve at least one segment of an updated embedded computer program based on the exchanged information.

12. The system of claim 11, the at least one computing device further including a component configured to contact the second vehicle using the wireless communication device.

13. The system of claim 11, the at least one computing device further including a component configured to provide the embedded computer program for use in the second vehicle based on the exchanged information.

14. The system of claim 11, the at least one computing device further including a component configured to check a validity of the retrieved updated embedded computer program, wherein the checking the validity of the retrieved updated embedded computer program includes checking an integrity and an authenticity of the retrieved updated embedded computer program using a signature associated with the retrieved updated embedded computer program.

15. The system of claim 11, the at least one computing device first further including a component configured to install the retrieved updated embedded computer program.

16. A program product stored on a computer readable medium for updating an embedded computer program on a first vehicle, the program product comprising:

program code for exchanging information with a second vehicle related to the embedded computer program using wireless communication means, wherein the embedded computer program is logically divided into segments and the exchanged information includes: an identification, version, size and installation prerequisite list for the embedded computer program, and a list of the embedded computer program segments each vehicle has already received for the embedded computer program; and program code for retrieving at least one segment of an updated embedded computer program from the second vehicle based on the exchanged information.

17. The program product of claim 16, further comprising program code for contacting the second vehicle.

18. The program product of claim 16, further comprising program code for providing the embedded computer program for use in the second vehicle based on the exchanged information.

19. The program product of claim 16, further comprising program code for checking a validity of the retrieved updated embedded computer program, wherein the checking the validity of the retrieved updated embedded computer program includes checking an integrity and an authenticity of the retrieved updated embedded computer program using a signature associated with the retrieved updated embedded computer program.

20. The program product of claim 16, further comprising program code for installing the retrieved updated embedded computer program.

* * * * *